United States Patent
Lauer et al.

(10) Patent No.: US 8,473,156 B2
(45) Date of Patent: Jun. 25, 2013

(54) DRIVING DYNAMICS CONTROL SYSTEM FOR VEHICLES

(75) Inventors: Peter Lauer, Karben (DE); Thomas Raste, Oberursel (DE); Roger Bauer, Frankfurt am Main (DE)

(73) Assignee: Continental Teves AG & Co. oHG (DE)

( * ) Notice: Subject to any disclaimer, the term of this patent is extended or adjusted under 35 U.S.C. 154(b) by 100 days.

(21) Appl. No.: 13/124,249

(22) PCT Filed: Oct. 15, 2009

(86) PCT No.: PCT/EP2009/063509
§ 371 (c)(1),
(2), (4) Date: Apr. 14, 2011

(87) PCT Pub. No.: WO2010/043686
PCT Pub. Date: Apr. 22, 2010

(65) Prior Publication Data
US 2011/0202237 A1   Aug. 18, 2011

(30) Foreign Application Priority Data
Oct. 17, 2008   (DE) .......................... 10 2008 052 202

(51) Int. Cl.
| | |
|---|---|
| B62D 6/00 | (2006.01) |
| B62D 5/00 | (2006.01) |
| B60G 17/018 | (2006.01) |
| G05D 1/00 | (2006.01) |
| G05D 3/00 | (2006.01) |
| G06F 7/00 | (2006.01) |
| G06F 17/00 | (2006.01) |
| G06F 7/70 | (2006.01) |

(52) U.S. Cl.
USPC ........ 701/38; 701/1; 701/36; 701/37; 701/41; 701/48; 701/70; 180/402; 180/446

(58) Field of Classification Search
None
See application file for complete search history.

(56) References Cited

U.S. PATENT DOCUMENTS
5,809,444 A * 9/1998 Hadeler et al. .................. 701/72
5,862,503 A * 1/1999 Eckert et al. .................... 701/78
(Continued)

FOREIGN PATENT DOCUMENTS
DE   10226683 A1   12/2003
DE   10341412 A1   1/2005
(Continued)

OTHER PUBLICATIONS

Peter Lauer et al. Simulation Based Development within Global Chassis Control, IEEE 2006, p. 2309-2314.*
(Continued)

*Primary Examiner* — Fadey Jabr
*Assistant Examiner* — Kevin P Mahne
(74) *Attorney, Agent, or Firm* — RatnerPrestia (57) ABSTRACT

A driving dynamics control system for vehicles. The control system including at least one driving dynamics controller that is fed setpoint specifications and driving state variables as input data. The control system also includes a plurality of actuators that can be controlled and/or regulated to modify the dynamics of the vehicle, such as steering, adjustable independently of the driver, on a front and/or rear axle of the vehicle, a chassis adjustable independently of the driver, a brake adjustable independently of the driver, and a drive train adjustable independently of the driver. The driving dynamics controller determines a central control specification from the setpoint specifications and the driving state variables and sends it to a distribution algorithm that distributes the control specification into manipulated variables for driving the actuators.

11 Claims, 4 Drawing Sheets

U.S. PATENT DOCUMENTS

| | | | |
|---|---|---|---|
| 6,721,636 B1* | 4/2004 | Gade | 701/1 |
| 7,058,492 B1* | 6/2006 | Yasui et al. | 701/38 |
| 7,305,292 B2* | 12/2007 | Lohner et al. | 701/41 |
| 2002/0066616 A1* | 6/2002 | Wessman | 180/446 |
| 2003/0171865 A1* | 9/2003 | Moser et al. | 701/48 |
| 2004/0007412 A1* | 1/2004 | Neef et al. | 180/402 |
| 2005/0182548 A1* | 8/2005 | Bernzen et al. | 701/70 |
| 2005/0228565 A1* | 10/2005 | Lohner et al. | 701/41 |
| 2005/0256622 A1* | 11/2005 | Futterer et al. | 701/48 |
| 2006/0025896 A1* | 2/2006 | Traechtler et al. | 701/1 |
| 2006/0122741 A1* | 6/2006 | Bassiere et al. | 701/1 |
| 2007/0150116 A1* | 6/2007 | Schwarz et al. | 701/1 |
| 2007/0219699 A1* | 9/2007 | Graf | 701/72 |
| 2008/0281521 A1* | 11/2008 | Shirato | 701/301 |
| 2008/0319615 A1* | 12/2008 | Bernzen et al. | 701/45 |
| 2010/0004815 A1* | 1/2010 | Ewerhart et al. | 701/35 |
| 2011/0054736 A1* | 3/2011 | Giers et al. | 701/37 |

FOREIGN PATENT DOCUMENTS

| | | |
|---|---|---|
| DE | 102004017385 A1 | 10/2005 |
| WO | 2004101337 A1 | 11/2004 |
| WO | 2006077255 A1 | 7/2006 |

OTHER PUBLICATIONS

International Search Report for PCT/EP2009/063509 mailed Jan. 14, 2010.

German Search Report for DE 10 2009 049 635.1 dated Oct. 15, 2009.

* cited by examiner

DRIVING DYNAMICS CONTROL SYSTEM FOR VEHICLES

CROSS REFERENCE TO RELATED APPLICATIONS

This application is the U.S. National Phase Application of PCT International Application No. PCT/EP2009/063509, filed Oct. 15, 2009, which claims priority to German Patent Application No. 10 2008 052 202.3, filed Oct. 17, 2008, the contents of such applications being incorporated by reference herein.

FIELD OF THE INVENTION

The present invention relates to a driving dynamics control system for vehicles.

BACKGROUND OF THE INVENTION

Active, electrically operable chassis and drive train components with independently operable actuators are making increasing in-roads into modern automobile technology, since they may be used to influence the driving behavior of a motor vehicle in a targeted fashion. A driving dynamics control system is now faced with the task of needing to divide the stabilization interventions it has calculated between one or more actuators as control specifications.

There are known from the prior art systems that, in coexistence with other systems, independently influence the driving behavior of a motor vehicle by virtue of the fact that each system operates that actuator for which it is responsible. In this case there is no integrated driving dynamics controller, but individual control systems that attempt independently of one another to attain a desired driving behavior by operating an actuator.

In the case of systems comprising a central driving dynamics controller, the prior art has disclosed rule-based division algorithms of the control specification of the driving dynamics controller. Either the division of the control specification of the driving dynamics controller between the manipulated variables of the actuators is carried out via empirically determined distribution factors or via a sequential concatenation of the individual manipulated variables. In the case of a method with empirically determined distribution factors, it is customary to determine the distribution factors in simulation studies or directly by trial series in the vehicle. A sequential concatenation also takes account of the fact that the actuators satisfy different comfort requirements. Consequently, in the case of sequential concatenation the first step is to take account of those actuators that can most comfortably implement the control requirement. If their potential is insufficient, the more uncomfortable actuators come into use.

WO 2004/101337 A1, incorporated herein by reference, discloses a driving dynamics control system for vehicles that has a signal distribution that is fed vehicle data, environmental data and data relating to the driver's wishes as input data. In this process, a plurality of subsystems that can be controlled and/or regulated and modify the dynamics of the vehicle, such as steering adjustable independently of the driver, a chassis adjustable independently of the driver, a brake adjustable independently of the driver, and a drive train adjustable independently of the driver are provided. In the case of the previously known driving dynamics control system, the data from the signal distribution are fed to a central determination unit, and the central determination unit determines a central control objective from the data of the signal distribution. The central control objective is fed to a central manipulated variable distribution or a central driving state controller that, in an interactive communication with the subsystems, drives said subsystems in such a way that the control objective is implemented by the subsystems on the vehicle. This method is, however, less suitable in the normal driving range and in the limit range in terms of driving dynamics.

SUMMARY OF THE INVENTION

It is therefore an object of the invention to improve a driving dynamics control system of the generic type described above so that the driving characteristics of a motor vehicle with reference to longitudinal, lateral and vertical dynamics are improved.

The present invention relates to a driving dynamics control system for vehicles, comprising at least one driving dynamics controller that is fed setpoint specifications, on the one hand, and driving state variables on the other hand, as input data, and comprising a plurality of actuators that can be controlled and/or regulated and modify the dynamics of the vehicle, such as steering, adjustable independently of the driver, on a front and/or rear axle of the vehicle, a chassis adjustable independently of the driver, a brake adjustable independently of the driver, and a drive train adjustable independently of the driver, the driving dynamics controller determining a central control specification from the setpoint specifications and the driving state variables and feeding it to a distribution algorithm that distributes the control specification into manipulated variables for driving the actuators.

Here, a driving dynamics control system is for optimally dividing manipulated variables of the actuators between any desired active chassis components. To this end, the distribution algorithm is fed the state of the actuators when generating the manipulated variables to take account of the current control potential and the current actuating speed of the actuators and their possible contribution to the implementation of the control specification.

The control specifications of the driving dynamics controller consist of physical variables of the longitudinal, lateral and vertical dynamics, and is a vectorial function of the driving state variables and the manipulated variables of the actuators. In a particularly advantageous development, it is provided that the distribution algorithm minimizes the deviation between the control specifications of the vehicle dynamics controller and the manipulated variables in order to improve the driving behavior of a motor vehicle both in the normal driving range and in the limit range in terms of driving dynamics.

The following system of equations is applied in order to minimize the deviation between the control specifications and the manipulated variables:

$$\min_{\underline{u}} J = \gamma \|W_v(B\underline{u} - \underline{v})\| + \|W_u(\underline{u} - \underline{u}_d)\|$$

$$\underline{u}_{min} <= \underline{u} <= \underline{u}_{max}; \ \underline{\dot{u}}_{min} <= \underline{\dot{u}} <= \underline{\dot{u}}_{max}$$

$$dim(B) = (m \times n); \ dim(\underline{u}) = (m \times 1); \ dim(\underline{v}) = (n \times 1)$$

A further advantageous development provides that the distribution algorithm includes a matrix with the aid of which the manipulated variables are multiplied in order to obtain the control specification. The matrix includes for each operating point the current control potential actuators in order to ensure an optimum distribution of the control specification into the manipulated variables of the actuators.

Here, the matrix is designed as a Jacobi matrix whose entries are formed from partial derivatives of the vectorial function of the driving state variables and the manipulated variables of the actuators. The matrix is determined with the aid of the following relationship:

$$B = \left(\frac{\partial g_i}{\partial u_j}\right)_{i=1,\ldots,n; j=1,\ldots,m}.$$

For a control specification consisting of the physical variable of the yaw moment, the distribution algorithm calculates and distributes an additional steering angle for front wheel steering, an additional steering angle for rear wheel steering, and a distribution parameter for dividing the roll support forces between two stabilizers of the chassis operable independently of the driver.

For a control specification consisting of the physical variables of the global longitudinal force, the global lateral force and the global yaw moment, the distribution algorithm calculates and distributes a steering angle for front wheel steering, a steering angle for rear wheel steering and individual wheel brake or wheel drive torques as well as a distribution parameter for dividing the roll support forces between the two stabilizers of the chassis operable independently of the driver.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
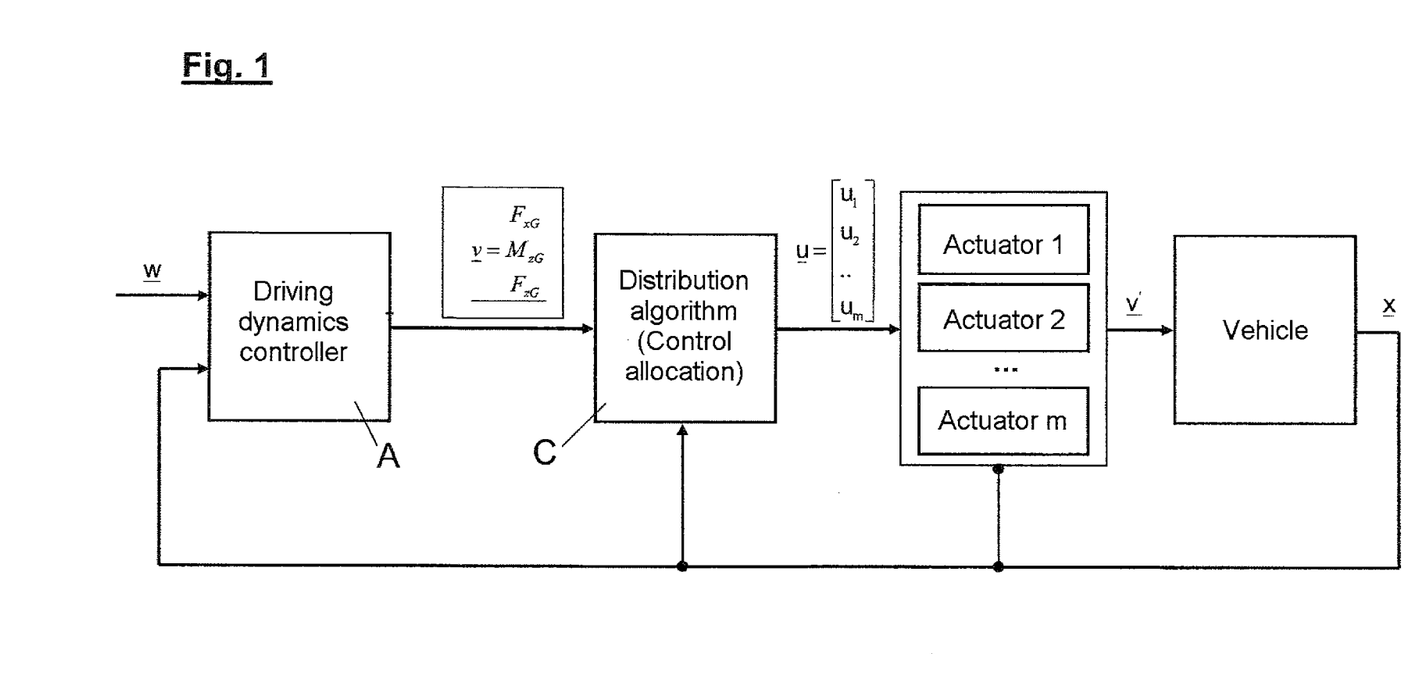
FIG. 1 shows a simplified illustration of the basic structure of the inventive driving dynamics control system.

The driving dynamics control system is illustrated in its basic structure in FIG. 1 as a control loop. A driving dynamics controller A calculates a control specification v of the driving dynamics controller from a setpoint specification w and a driving state variable x. As is illustrated in FIG. 1, the control specification v of the driving dynamics controller includes the three global force components $F_{xG}$, $M_{zG}$ and $F_{zG}$ in the case of longitudinal, lateral and vertical dynamics. The force component $F_{xG}$ in this case denotes the longitudinal force of the motor vehicle, while the force component $M_{zG}$ denotes the yaw moment and the force component $F_{zG}$ the support force of the vehicle body. Further components such as, for example, the lateral force of the motor vehicle $F_{yG}$, the longitudinal moment $M_{xG}$ or the lateral moment $M_{yG}$ can be added if required. Depending on the application, the manipulated variables serve to stabilize the motor vehicle in the driving dynamics limit range or to increase the vehicle agility in the normal driving range.

The distribution algorithm C described in this invention divides the control specification v of the driving dynamics controller A in accordance with the optimization function specified in equation I between the actuators 1 to m, and produces therefor the corresponding manipulated variables u. This requires a solution of an underdetermined system of equations with secondary conditions for the control range and the actuating speed of the actuators 1 to m, this being done with the aid of the method of least error squares:

$$\min_{\underline{u}} J = \gamma \|W_v(B\underline{u} - \underline{v})\| + \|W_u(\underline{u} - \underline{u}_d)\| \qquad (I)$$

$$\underline{u}_{min} <= \underline{u} <= \underline{u}_{max}; \dot{\underline{u}}_{min} <= \dot{\underline{u}} <= \dot{\underline{u}}_{max}$$

$$dim(B) = (m \times n); dim(\underline{u}) = (m \times 1); dim(\underline{v}) = (n \times 1)$$

In the first summand, the function describes the deviation between the control specification v and the manipulated variables u. In order to be able to compare the manipulated variables u with the control specification v, they are multiplied by the (m×n)-matrix B. The matrix B represents a linear relationship between the physical manipulated variables of the actuators and the control specification v that was calculated by the driving dynamics controller A. The matrix B therefore describes the linearized actuator potential at the current operating point. The distribution algorithm C now attempts to minimize the deviation between the manipulated variables u and the control specification v. The control specifications v can be weighted individually via the weighting matrix $W_v$.

Assuming that the control specification v and the manipulated variables u can be mapped via the vector function g: $\Re \to \Re$ in accordance with $$\underline{v} = \underline{g}(\underline{x}, \underline{u}) \qquad (II)$$

the matrix B can be calculated as a Jacobi matrix via the following relationship:

$$B = \left(\frac{\partial g_i}{\partial u_j}\right)_{i=1,\ldots,n; j=1,\ldots,m} \qquad (III)$$

The following exemplary embodiment shows the control of the lateral dynamics of a motor vehicle by the application of the previously described method. What is considered is a vehicle having the following active, electronically drivable chassis components: front wheel steering with angle superposition, rear wheel steering and roll stabilizer. Here, for a control specification v comprising the physical variable of the yaw moment $M_{zG}$ the distribution algorithm C calculates an additional steering angle for front wheel steering $\Delta\delta_v$, an additional steering angle for rear wheel steering $\Delta\delta_h$, and a distribution parameter $\lambda$ for dividing the roll support forces between two stabilizers of the chassis operable independently of the driver and distributes these appropriately.

The yaw moment $M_{zG}$ is regarded as the control specification v. The manipulated variables of the actuators are an additional steering angle for front wheel steering $\Delta\delta_v$, an additional steering angle for rear wheel steering $\Delta\delta_h$, and a distribution parameter $\lambda$ for dividing the roll support forces between the two stabilizers.

Figure 2:
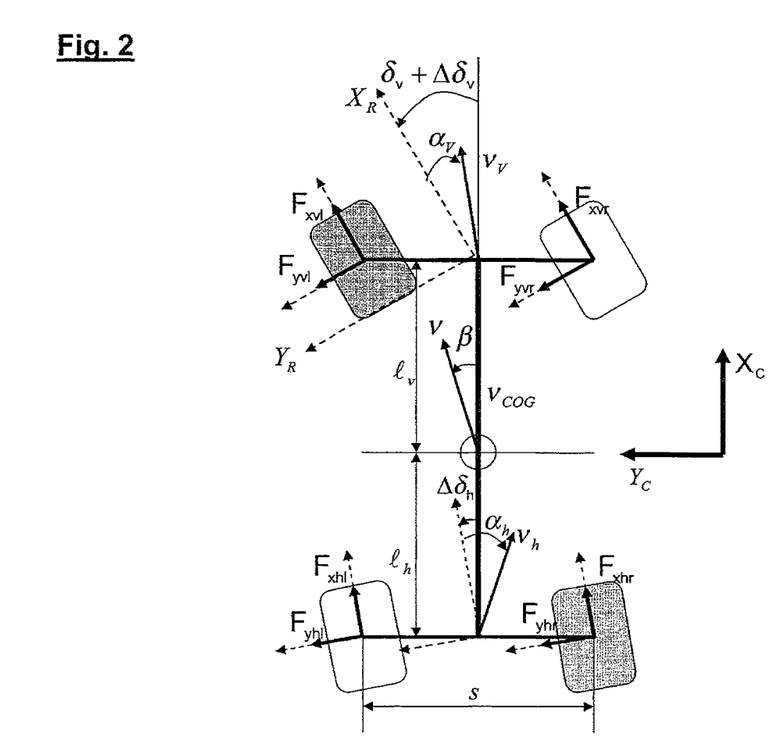
FIG. 2 shows a schematic of the vehicle model used for calculating the yaw moment.

FIG. 2 illustrates the vehicle model under consideration together with the longitudinal and lateral forces acting on the wheels. As is expressed in equation IV, the yaw moment $M_{zG}$ acting on the vehicle can be determined as a function of the additional steering angles $\Delta\delta_v$ and $\Delta\delta_h$ by balancing the moments.

$$M_{zG} = \begin{bmatrix} -\frac{s}{2} \\ \ell_v \end{bmatrix}^T \begin{bmatrix} {}^cF_{xvl} \\ {}^cF_{yvl} \end{bmatrix} + \begin{bmatrix} \frac{s}{2} \\ \ell_v \end{bmatrix}^T * \begin{bmatrix} {}^cF_{xvr} \\ {}^cF_{yvr} \end{bmatrix} + \begin{bmatrix} -\frac{s}{2} \\ -\ell_h \end{bmatrix}^T * \begin{bmatrix} {}^cF_{xhl} \\ {}^cF_{yhl} \end{bmatrix} + \begin{bmatrix} \frac{s}{2} \\ -\ell_h \end{bmatrix}^T * \begin{bmatrix} {}^cF_{xhr} \\ {}^cF_{yhr} \end{bmatrix} \quad (IV)$$

$$= \begin{bmatrix} -\frac{s}{2} \\ \ell_v \end{bmatrix}^T \cdot \begin{bmatrix} \cos(\delta_v + \Delta\delta_v) & -\sin(\delta_v + \Delta\delta_v) \\ \sin(\delta_v + \Delta\delta_v) & \cos(\delta_v + \Delta\delta_v) \end{bmatrix} \cdot \begin{bmatrix} F_{xvl} \\ F_{yvl} \end{bmatrix} +$$

$$\begin{bmatrix} \frac{s}{2} \\ \ell_v \end{bmatrix}^T \cdot \begin{bmatrix} \cos(\delta_v + \Delta\delta_v) & -\sin(\delta_v + \Delta\delta_v) \\ \sin(\delta_v + \Delta\delta_v) & \cos(\delta_v + \Delta\delta_v) \end{bmatrix} \cdot \begin{bmatrix} F_{xvr} \\ F_{yvr} \end{bmatrix} +$$

$$\begin{bmatrix} -\frac{s}{2} \\ -\ell_h \end{bmatrix}^T \cdot \begin{bmatrix} \cos(\Delta\delta_h) & -\sin(\Delta\delta_h) \\ \sin(\Delta\delta_h) & \cos(\Delta\delta_h) \end{bmatrix} \cdot \begin{bmatrix} F_{xhl} \\ F_{yhl} \end{bmatrix} +$$

$$\begin{bmatrix} \frac{s}{2} \\ -\ell_h \end{bmatrix}^T \cdot \begin{bmatrix} \cos(\Delta\delta_h) & -\sin(\Delta\delta_h) \\ \sin(\Delta\delta_h) & \cos(\Delta\delta_h) \end{bmatrix} \cdot \begin{bmatrix} F_{xhr} \\ F_{yhr} \end{bmatrix}$$

The lateral forces $F_y$ are yielded from the tire model specified in equation V. The model may be used for the analytical calculation of the lateral forces as a function of the slip angle $\alpha$, and the longitudinal forces $F_x$ and the wheel vertical forces $F_z$ as well as some tire model parameters. The tire model also includes a slip stiffness $C_{\alpha o}$ dependent on $F_z$.

$$F_y = \begin{cases} \left( C_{\alpha 0} F_Z \alpha - \text{sign}(\alpha) \dfrac{C_{\alpha 0}^2 F_Z^2}{4\mu F_Z} \alpha^2 \right) \sqrt{1 - \left( \dfrac{F_x}{\mu_0 F_Z} \right)^2}, & |\alpha| < \dfrac{2\mu_0}{C_{\alpha 0}} \\ \text{sign}(\alpha) \mu_0 F_Z \sqrt{1 - \left( \dfrac{F_x}{\mu_0 F_Z} \right)^2}, & |\alpha| \geq \dfrac{2\mu_0}{C_{\alpha 0}} \end{cases} \quad (V)$$

where $C_{\alpha 0} = C_{\alpha 1} + C_{\alpha 2} * \dfrac{F_z}{F_{z0}}$ and $$\alpha_v = \delta_v - \beta - \frac{\ell_v}{v}\dot{\psi} + \Delta\delta_v; \quad \alpha_h = -\beta + \frac{\ell_h}{v}\dot{\psi} + \Delta\delta_h$$

Figure 3:
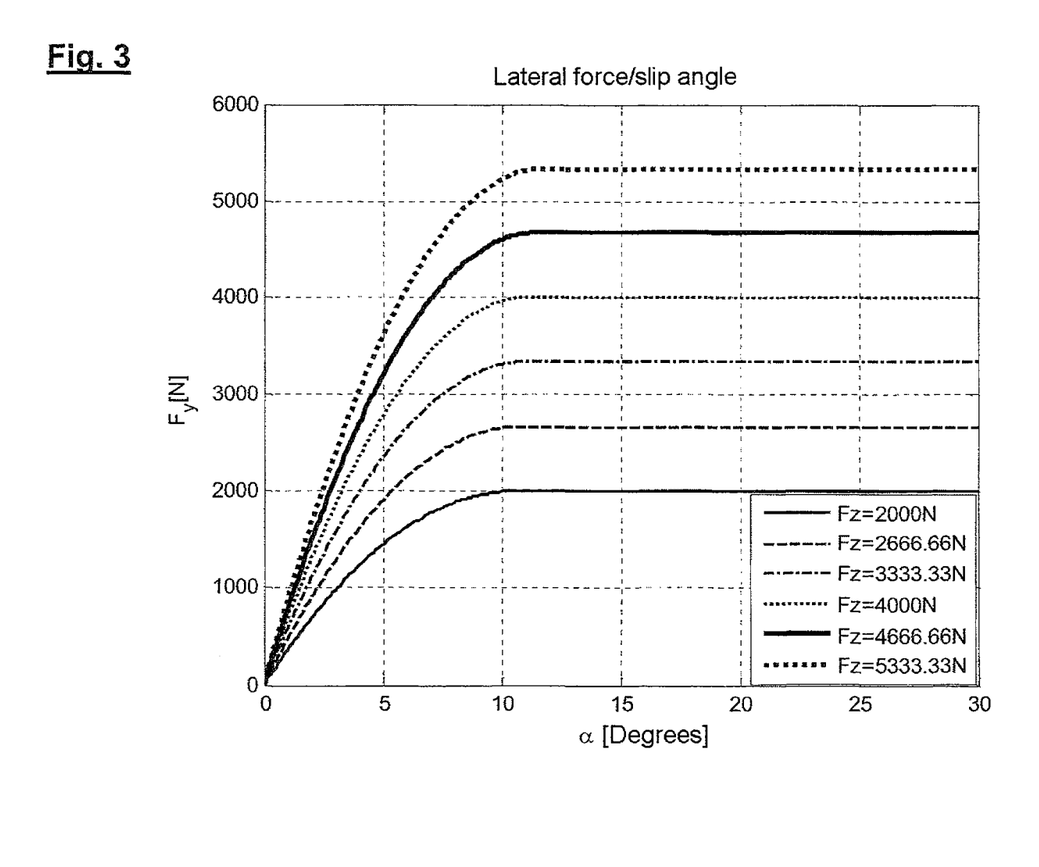
FIG. 3 shows a diagram of the tire model used in which the lateral force is plotted against a slip angle for various vertical forces given a fixed friction value.

FIG. 3 illustrates the tire characteristics as a lateral force/slip angle diagram for selected vertical forces $F_z$ and a fixed coefficient of friction.

The longitudinal forces $F_x$ are determined by the braking torque exerted during braking and, on the driven axle, additionally by the driving torque. They can be calculated approximately by using equation VI:

$$F_x = \begin{cases} -\dfrac{P_{wheel} \cdot C_{PM}}{r_{dyn}} & \text{(non-driven wheel)} \\ \dfrac{M_{eng} \cdot i_{drive}}{2 \cdot r_{dyn}} - \dfrac{P_{wheel} \cdot C_{PM}}{r_{dyn}} & \text{(driven wheel)} \end{cases} \quad (VI)$$

$P_{wheel}$=brake pressure
$C_{PM}$=conversion factor from brake pressure to brake torque
$r_{dyn}$=dynamic tire radius
$M_{eng}$=engine torque
$i_{drive}$=transmission ratio of the drive train The distribution parameter $\lambda$ for dividing the roll moments between the two vehicle axles acts as follows on the vertical force $F_z$ of the individual wheels:

$$F_{zvl} = m \cdot g \frac{l_h}{2(l_v + l_h)} - 2 \cdot \frac{m \cdot v \cdot \dot{\psi} \cdot h \cdot \lambda}{s} \quad (VII)$$

$$F_{zvr} = m \cdot g \frac{l_h}{2(l_v + l_h)} + 2 \cdot \frac{m \cdot v \cdot \dot{\psi} \cdot h \cdot \lambda}{s}$$

$$F_{zhl} = m \cdot g \frac{l_v}{2(l_v + l_h)} - 2 \cdot \frac{m \cdot v \cdot \dot{\psi} \cdot h \cdot (1-\lambda)}{s}$$

$$F_{zhr} = m \cdot g \frac{l_v}{2(l_v + l_h)} + 2 \cdot \frac{m \cdot v \cdot \dot{\psi} \cdot h \cdot (1-\lambda)}{s}$$

m=vehicle mass
g=gravitational constant
v=vehicle (longitudinal) speed
h=centroid height
s=track
$I_v$=distance from centroid to front axle
$I_h$=distance from centroid to front axle
$\dot{\psi}$=yaw rate The distribution parameter $\lambda$ varies in the range between 0 and 1, the value $\lambda=0$ signifying that the total roll moment of the rear axle is applied. Correspondingly, the total roll moment is supported via the front axle given the value $\lambda=1$.

Substituting equations V, VI and VII in equation IV yields a closed representation between the virtual yaw moment $M_{zG}$ and the actuator manipulated variables $\Delta\delta_v$, $\Delta\delta_h$ and $\lambda$. The following relationship results by analogy to equation II:

$$\underline{v} = M_{zG} = \underline{g}(\Delta\delta_v, \Delta\delta_h, \lambda) \quad (VIII)$$

After the calculation of the B-matrix in accordance with equation III, the optimization algorithm specified in equation I can be applied directly and the optimum manipulated variables can be calculated.

In a second exemplary embodiment, the global longitudinal force, the lateral force and the yaw moment are used as control specification. The second exemplary embodiment shows the control of the lateral dynamics of a motor vehicle by application of the above described method. What is considered is a vehicle having the following active, electronically drivable chassis components: front wheel steering with angle interface, rear wheel steering, roll stabilizer and brake system with wheel torque interface or, alternatively, a system with monitoring of the wheel torques or with wheel hub motors. For a control specification v comprising the physical variable of the global longitudinal force $F_{xG}$, the global lateral force $F_{yG}$ and the global yaw moment $M_{zG}$, the distribution algorithm C calculates a steering angle for front wheel steering $\Delta\delta_v$, a steering angle for rear wheel steering $\Delta\delta_h$ and individual wheel brake or wheel drive torques $M_{wheel,vl}$, $M_{wheel,vr}$, $M_{wheel,hl}$, $M_{wheel,hr}$, as well as a distribution parameter $\lambda$ for dividing the roll support forces between the two stabilizers of the chassis that can be operated independently of the driver.

The following relationship results for manipulated variables $\underline{u}$ and control specification $\underline{v}$:

$$\underline{u} = \begin{bmatrix} u_1 \\ u_2 \\ u_3 \\ u_4 \\ u_5 \\ u_6 \\ u_7 \end{bmatrix} = \begin{bmatrix} \Delta\delta_v \\ \Delta\delta_h \\ M_{wheel,vl} \\ M_{wheel,vr} \\ M_{wheel,hl} \\ M_{wheel,hr} \\ \lambda \end{bmatrix}, \underline{v} = \begin{bmatrix} F_{xG} \\ F_{yG} \\ M_{zG} \end{bmatrix} = \begin{bmatrix} g_1(\underline{u}) \\ g_2(\underline{u}) \\ g_3(\underline{u}) \end{bmatrix}, \quad \text{(IX)}$$

The global forces and moments/torques are determined for a two-dimensional vehicle model from the equations below:

$$\begin{aligned} F_{xG} &= (F_{x,vl} + F_{x,vr})\cos(\delta_v + \Delta\delta_v) - (F_{y,vl} + F_{y,vr})\sin(\delta_v + \Delta\delta_v) + \\ &\quad (F_{x,hl} + F_{x,hr})\cos(\Delta\delta_h) - (F_{y,hl} + F_{y,hr})\sin(\Delta\delta_h) \\[4pt] F_{yG} &= (F_{x,vl} + F_{x,vr})\sin(\delta_v + \Delta\delta_v) + (F_{y,vl} + F_{y,vr})\cos(\delta_v + \Delta\delta_v) + \\ &\quad (F_{x,hl} + F_{x,hr})\sin(\Delta\delta_h) - (F_{y,hl} + F_{y,hr})\cos(\Delta\delta_h) \\[4pt] M_{zG} &= F_{x,vl}\left(-\frac{s}{2}\cos(\delta_v + \Delta\delta_v) + l_v\sin(\delta_v + \Delta\delta_v)\right) + F_{y,vl}\left(\frac{s}{2}\sin(\delta_v + \Delta\delta_v) + l_v\cos(\delta_v + \Delta\delta_v)\right) + \\ &\quad F_{x,vr}\left(\frac{s}{2}\cos(\delta_v + \Delta\delta_v) + l_v\sin(\delta_v + \Delta\delta_v)\right) + F_{y,vr}\left(-\frac{s}{2}\sin(\delta_v + \Delta\delta_v) + l_v\cos(\delta_v + \Delta\delta_v)\right) + \\ &\quad F_{x,hl}\left(-\frac{s}{2}\cos(\Delta\delta_h) - l_h\sin(\Delta\delta_h)\right) + F_{y,hl}\left(\frac{s}{2}\sin(\Delta\delta_h) - l_h\cos(\Delta\delta_h)\right) + \\ &\quad F_{x,hr}\left(\frac{s}{2}\cos(\Delta\delta_h) - l_h\sin(\Delta\delta_h)\right) + F_{y,hr}\left(-\frac{s}{2}\sin(\Delta\delta_h) - l_h\cos(\Delta\delta_h)\right) \end{aligned} \quad \text{(X)}$$

The lateral forces $F_y$ in equation X follow from the tire model specified in equation V. The following relationship is used for $F_x$ in equation V and equation X:

$$F_{x,i} = \frac{M_{wheel,i}}{r_{dyn}} \quad \text{(XI)}$$

The inequalities $$-|k\mu_0 F_{z,i}| \leq \frac{M_{wheel,i}}{r_{dyn}} \leq 0 \quad \text{(XII)}$$

with the application parameter k, the coefficient of friction $\mu_0$ and the vertical forces from equation VII, resulting from the Kamm's circle can be further supplemented in the case of the secondary conditions in equation I. The Jacobi matrix B is yielded in accordance with equation III as $$B = \begin{bmatrix} \frac{\partial g_1}{\partial u_1} & \frac{\partial g_1}{\partial u_2} & \frac{\partial g_1}{\partial u_3} & \frac{\partial g_1}{\partial u_4} & \frac{\partial g_1}{\partial u_5} & \frac{\partial g_1}{\partial u_6} & \frac{\partial g_1}{\partial u_7} \\ \frac{\partial g_2}{\partial u_1} & \frac{\partial g_2}{\partial u_2} & \frac{\partial g_2}{\partial u_3} & \frac{\partial g_2}{\partial u_4} & \frac{\partial g_2}{\partial u_5} & \frac{\partial g_2}{\partial u_6} & \frac{\partial g_2}{\partial u_7} \\ \frac{\partial g_3}{\partial u_1} & \frac{\partial g_3}{\partial u_2} & \frac{\partial g_3}{\partial u_3} & \frac{\partial g_3}{\partial u_4} & \frac{\partial g_3}{\partial u_5} & \frac{\partial g_3}{\partial u_6} & \frac{\partial g_3}{\partial u_7} \end{bmatrix} \quad \text{(XIII)}$$

Figure 4:
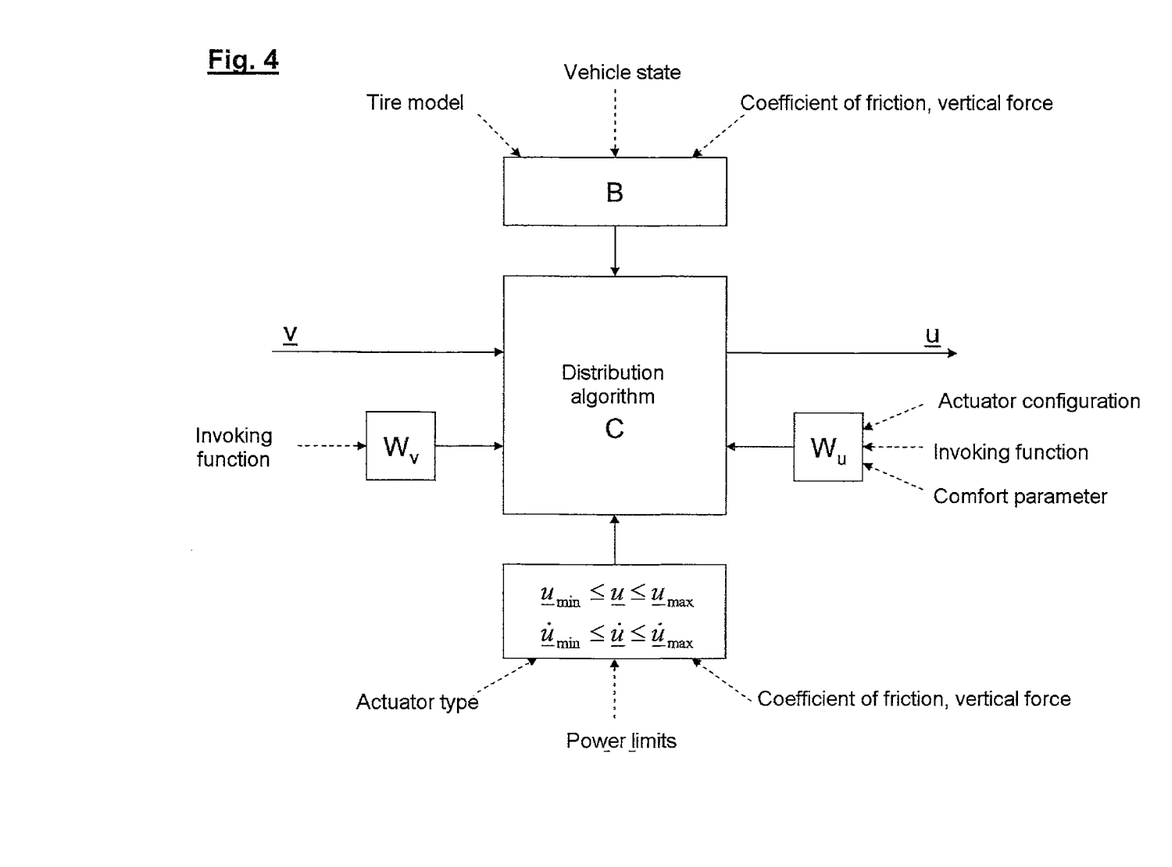
FIG. 4 shows a schematic of the parameters influencing the inventive distribution algorithm.

For the purpose of explanation, FIG. 4 illustrates schematically the influence of the input parameters inventive distribution algorithm C. The distribution algorithm C is fed the control specification v, and the distribution algorithm C produces the manipulated variables u taking account of the actuator states, in order to take account of their current control potential, their current actuating speed and their possible contribution to the implementation of the control specification v. The distribution algorithm C has the matrix B by which the manipulated variables u are multiplied in order to obtain the control specification v. Featured in the matrix B are data of the tire model, which is represented in equation V and illustrated in FIG. 3, the driving state of the motor vehicle and the coefficient of friction together with the vertical force of the wheels of the motor vehicle. On the other hand, the control range, and thus the bounds of the manipulated variables u and their speed depend on the driven actuator type, on the power limits of the driven actuator type and, in turn, on the coefficient of friction together with the vertical force of the wheels of the motor vehicle.

As is further illustrated in FIG. 4, the distribution algorithm C is influenced by the weighting matrix $W_v$ of the control specification v, the weighting matrix $W_v$ being dependent on the invoking function. The weighting matrix $W_u$ of the manipulated variables u depends on the invoking function, the actuator configuration and further comfort parameters that enable a comfortable drive with the motor vehicle.

The invention claimed is:

1. A driving dynamics control system for vehicles, comprising:
    at least one driving dynamics controller (A) supplied with setpoint specifications (w) and driving state variables (x) as input data, and
    a plurality of actuators (1 to m) that can be controlled and/or regulated to modify the dynamics of the vehicle
    wherein the driving dynamics controller (A) determines a central control specification (v) from the setpoint specifications (w) and the driving state variables (x) and processes the central control specification (v) with a distribution algorithm (C) that distributes the control specification (v) into manipulated variables (u) for driving the actuators (1 to m), and
    wherein the distribution algorithm (C) receives the state of the actuators (1 to m) when generating the manipulated variables (u) to take account of the current control potential and the current actuating speed of the actuators (1 to m) and their possible contribution to the implementation of the control specification (v).

2. The driving dynamics control system of claim 1, wherein the dynamics of the vehicle include steering, adjustable independently of the driver, on a front and/or rear axle of the vehicle, a chassis adjustable independently of the driver, a brake adjustable independently of the driver, a drive train adjustable independently of the driver or a combination thereof.

3. The driving dynamics control system of claim 1, wherein the control specifications (v) of the driving dynamics controller (A) comprise physical variables of the longitudinal, lateral and vertical dynamics.

4. The driving dynamics control system of claim 1, wherein the distribution algorithm (C) minimizes the deviation between the control specifications (v) of the vehicle dynamics controller (A) and the manipulated variables (u) in order to improve the driving behavior of a motor vehicle both in the normal driving range and in the limit range in terms of driving dynamics.

5. The driving dynamics control system of claim 4, wherein the following system of equations is applied to minimize the deviation between the control specifications (v) and the manipulated variables (u):

$$\min_{\underline{u}} J = \gamma \|W_v(B\underline{u} - \underline{v})\| + \|W_u(\underline{u} - \underline{u}_d)\|$$

$$\underline{u}_{min} <= \underline{u} <= \underline{u}_{max}; \dot{\underline{u}}_{min} <= \dot{\underline{u}} <= \dot{\underline{u}}_{max}$$

$$dim(B) = (m \times n); dim(\underline{u}) = (m \times 1); dim(\underline{v}) = (n \times 1).$$

6. The driving dynamics control system of claim 1, wherein the control specification (v) is a vectorial function v =g(x,u) of the driving state variables (x) and the manipulated variables (u).

7. The driving dynamics control system of claim 1, wherein the distribution algorithm (C) includes a matrix (B) which is used to multiply the manipulated variables (u) to obtain the control specification (v), the matrix (B) including for each operating point the current control potential actuators (1 to m) to ensure an optimum distribution of the control specification (v) into the manipulated variables (u) of the actuators (1 to m).

8. The driving dynamics control system of claim 7, wherein the matrix (B) is a Jacobi matrix whose entries are formed from partial derivatives of the vectorial function g, the matrix (B) being determined with the aid of the following relationship:

$$B = \left(\frac{\partial g_i}{\partial u_j}\right)_{i=1,\ldots,n; j=1,\ldots,m}.$$

9. The driving dynamics control system of claim 1, wherein the distribution algorithm (C) for a control specification (v) comprising the physical variable of the yaw moment (MzG) calculates and distributes an additional steering angle for front wheel steering (Δδv), an additional steering angle for rear wheel steering (Δδh), and a distribution parameter (λ) for dividing the roll support forces between two stabilizers of the chassis operable independently of the driver.

10. The driving dynamics control system of claim 9, wherein the calculation is performed with the aid of a vectorial function v=MzG=g(Δδv, Δδh, λ).

11. The driving dynamics control system of claim 1, wherein the distribution algorithm (C) for a control specification (v) comprising the physical variable of the global longitudinal force (FxG), the global lateral force (FyG) and the global yaw moment (MzG) calculates and distributes a steering angle for front wheel steering (Δδv), a steering angle for rear wheel steering (Δδh) and individual wheel brake or wheel drive torques (Mwheel,vl, Mwheel,vr, Mwheel,hl, Mwheel,hr) as well as a distribution parameter (λ) for dividing the roll support forces between the two stabilizers of the chassis operable independently of the driver.

* * * * *